April 4, 1967   R. P. LICKLITER ET AL   3,312,488
EXPANSION JOINT AND LOCKING CONNECTION
FOR SUPPORTING GRID SYSTEMS
Filed April 14, 1964   2 Sheets-Sheet 2
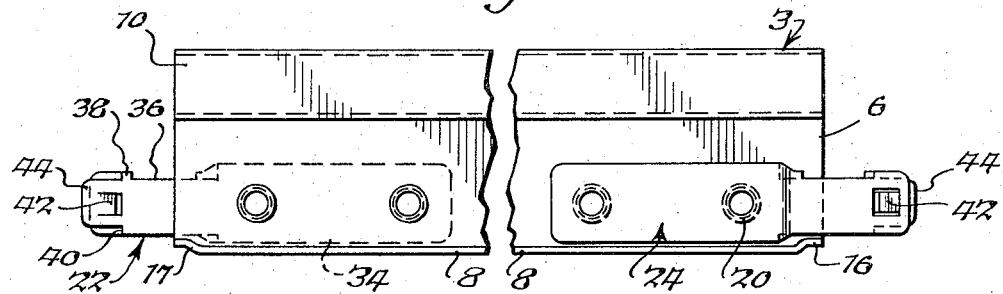
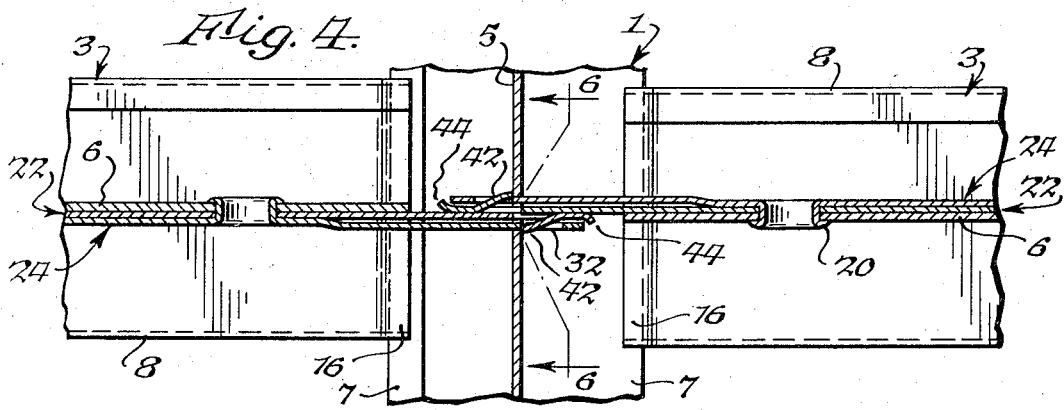
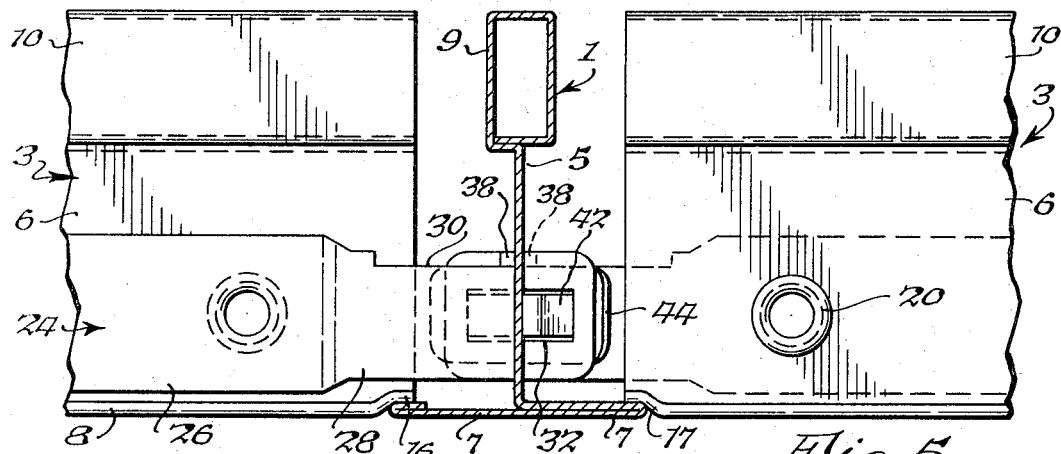
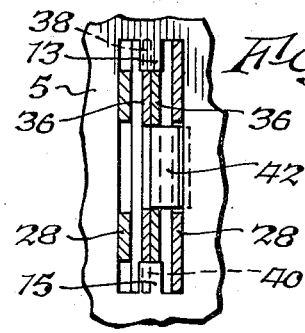
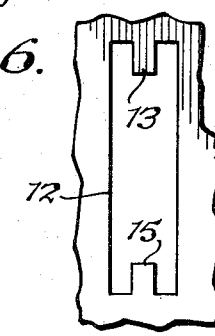
INVENTORS
Robert P. Lickliter,
Earl Abbott & John F. Reeves
BY Christel & Bean
ATTORNEYS.

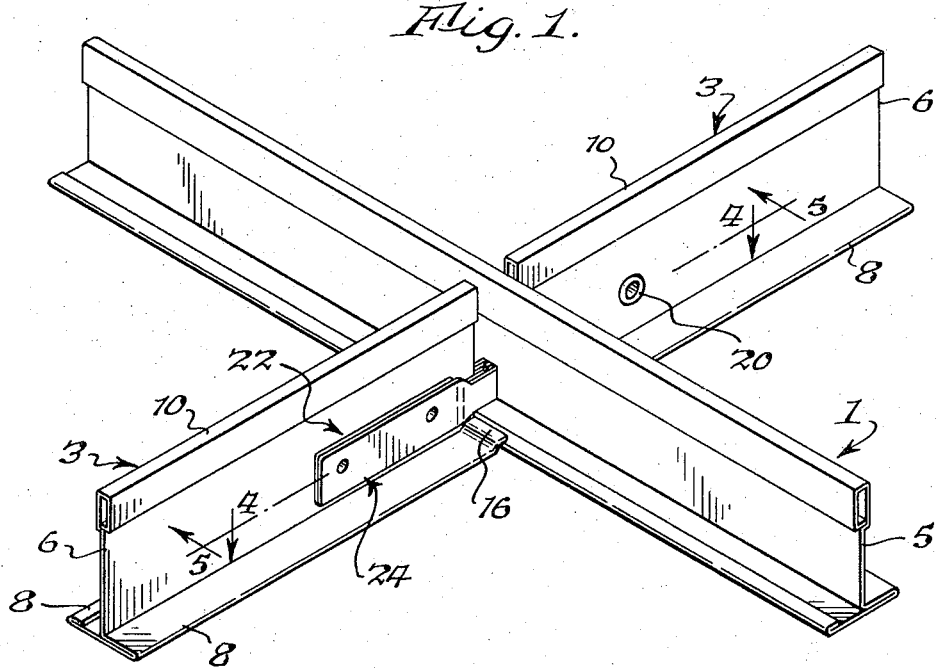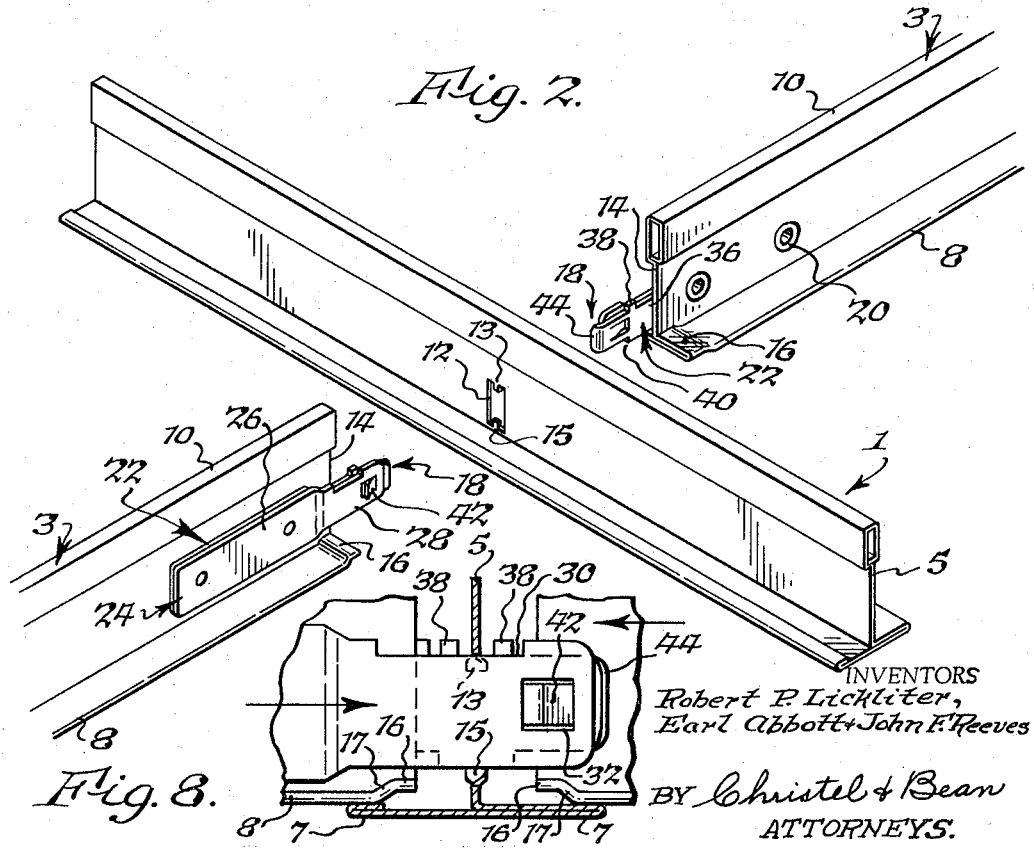

3,312,488
EXPANSION JOINT AND LOCKING CONNECTION FOR SUPPORTING GRID SYSTEMS

Robert P. Lickliter, 113 Buffalo St., and Earl Abbott, 81 Dudley Ave., both of Hamburg, N.Y. 14075, and John F. Reeves, Tonawanda, N.Y.; said Reeves assignor to said Lickliter and said Abbott
Filed Apr. 14, 1964, Ser. No. 359,588
11 Claims. (Cl. 287—189.36)

This invention relates generally to connectors for use in supporting grid systems and the like, and more specifically to a new and useful locking connector effecting an expansible joint.

While not limited thereto, the present invention is particularly concerned with the provision of locking connectors for tile supporting grid members of fire retarding ceilings. When subjected to extreme heat, such grid members seek to expand and will buckle if expansion cannot otherwise be accommodated. Buckling of the grid system is undesirable, because it raises the tiles and thereby diminishes or destroys the fire retarding qualities of the ceiling by permitting heat to escape through the buckled area.

Expansion of the grid members can be accommodated, by the provision of expansion joints. However, the strength and rigidity required by such systems must be provided. Also, practical considerations often dictate that the system be relatively simple and easily assembled without special tools.

Therefore, a primary object of our invention is to provide a locking connection for supporting grid systems and the like which slip-fits into assembled relation, by hand, with a simple, straight line motion, and which accommodates expansion of grid members subjected to extreme heat.

Another object of our invention is to provide the foregoing in a joint which is strong and rigid.

A further object of our invention is to provide a locking connector for supporting grid systems and the like having a snap lock automatically operable upon slip fitting the connector into place.

The connection of our invention is characterized in one aspect thereof by the provision of a first support member having a slot in its web for receiving a locking connector extending from a second support member, the connector having cooperating rigid and resilient elements with the resilient element adapted for movement away from the rigid element when effecting a connection with the first member, the resilient element having a part adapted to snap into locking engagement behind the web of the first member, the web having a stop tab extending into the slot for engagement by a shoulder on the resilient element, the tab yielding to permit passage of the shoulder upon expansion.

The foregoing and other objects, advantages and characterizing features of our invention will become apparent upon consideration of the following detailed description of an illustrative embodiment thereof, in conjunction with the accompanying drawings depicting the same in which like reference numerals denote like parts throughout and in which:

FIG. 1 is a fragmentary perspective view of intersecting supporting grid members incorporating locking connectors of this invention;

FIG. 2 is a corresponding view, but with the members disassembled;

FIG. 3 is a side elevational view of a supporting grid member incorporating locking connectors of our invention, being broken away for ease of illustration;

FIG. 4 is an enlarged, horizontal sectional view of the assembled joint, being taken about on line 4—4 of FIG. 1;

FIG. 5 is a vertical sectional view through the assembled joint, being taken about on line 5—5 of FIG. 1;

FIG. 6 is a fragmentary vertical sectional view, taken about on line 6—6 of FIG. 4;

FIG. 7 is a corresponding view, with the locking connectors removed; and

FIG. 8 is a fragmentary sectional view corresponding to that of FIG. 5, but illustrating the action occurring during expansion and the position of the parts after expansion.

Referring now in detail to the illustrative embodiment depicted in the accompanying drawings, FIG. 1 shows a ceiling tile supporting grid system incorporating locking connectors of our invention and including a main T support member, generally designated 1 releasably connected to a pair of cross T support members generally designated 3. Main T member 1 can be conveniently fabricated from a single piece of any suitable material to comprise a normally vertical web portion 5 upstanding from laterally projecting, tile supporting flanges 7 on opposite sides thereof and surmounted by a generally box-shaped, longitudinally extending, reinforcing member 9.

Web portion 5 is provided at spaced intervals with rectangular, normally vertical slots 12 for reception of the locking connectors on cross T members 3, only one such slot being illustrated. Slots 12 are generally H-shaped, being formed with downwardly and upwardly projecting stop tabs 13 and 15, respectively, at the top and bottom of the slot (FIG. 7).

Cross T members 3 can be similarly fabricated from a single piece of any suitable material to comprise a normally vertical web portion 6 upstanding from laterally projecting, tile supporting flanges 8 and surmounted by a generally box-shaped, longitudinally extending, reinforcing member 10. Flanges 8 are provided, adjacent the ends of cross T's 3 with an upwardly offset lip 16 joined to flanges 8 by an inclined cross surface 17. Lips 16 overlap main member flanges 7 in a normal connection, and to act as a cam causing cross T members 3 to override flanges 7 during expansion, as will be described in greater detail hereafter.

Cross T ends 14 are also provided with locking connectors of this invention, generally designated 18. Connectors 18 extend from the opposite end of each cross T member 3, being fixed to web portion 6 on opposite sides thereof by any suitable means such as rivets 20. Connectors 18 include a resilient, spring clip element 22 and a coincident rigid end member 24. Rivets 20 can be formed as tubular sleeves, struck from member 24, and extending through openings in member 22 and web 6, being peened over the latter. Each end member 24 includes a body portion 26 fixed to web 6, and a laterally outwardly offset neck portion 28 extending beyond cross T end 14. The upper edge of neck portion 28 has a recess 30 therein, providing a portion of reduced height, for a purpose to be described. Neck 28 also has an opening 32 formed in its outer end, for a purpose to be described.

Spring clip member 22 has a body 34 sandwiched between end member 24 and cross T web 6, and a laterally, resiliently displaceable neck 36, projecting beyond cross T 3 adjacent neck 28 of rigid member 24. Neck 36 has an upwardly projecting tab 38, providing a stop abutting the tab 13 in web slot 12, and has an undercut outer end providing a stop shoulder 40 abutting the tab 15 in web slot 12. Neck 36 has a spring finger 42 struck therefrom and disposed through opening 32 for locking engagement against main T web 5. The leading edge of spring clip 34 is rounded, as shown at 44, across the forward edge of end member 26, to facilitate insertion of connector 18 into slot 12.

When assembling the grid system, connectors 18 are inserted into slots 12. In the illustrated joint, connectors 18 from the adjacent ends of the alined cross T's 3 extend side by side through web 5. Stop tabs 13 and 15 are vertically alined, and divide each slot into a connected pair of slot portions, allowing connectors 18 to be inserted into each slot 12 from opposite sides of web portion 5.

As each connector 18 is inserted into its side of slot 12, finger 42 bears against web portion 5 adjacent the slot and is cammed out of the way, into its opening 32 permitting finger 42 to pass through the slot. The resiliency of finger 42, and of neck 36 permits deflection by such camming action. Rigid end member 24 is confined between tabs 13, 15 and the side of the slot. Further insertion of connector 18 causes finger 42 to pass beyond web 5, allowing the resiliently displaced finger 42 to snap back through opening 32, to the position shown in FIGS. 4 and 5. This positions finger 42 behind web 5, in locking engagement thereagainst, preventing the withdrawal of connector 18 from slot 12 and holding the associated cross T 3 connected to main T 1. In this locked position, upper and lower stops 38, 40 are located adjacent stop tabs 13, 15 respectively which block further insertion of the connector and lip 16 overlies flange 7. Connector 8 of the other cross T 3 is inserted through the other side of slot 12 in the same manner, but from the opposite side of main T 1.

To disconnect the grid members, spring clip neck 36 is resiliently displaced away from its end member 24, or finger 32 itself is depressed depending upon whether one or both connectors are in the slot. This can be done by hand, or with an appropriate tool and unlocks finger 42 from behind web portion 5. With finger 42 disengaged, connector 18 is easily withdrawn from slot 12, disconnecting its cross T 3 from main T 1.

Thus, under normal environmental conditions, cooperating spring clip 34 and end member 24 provide a rigid and strong, snap type connection which is easily assembled, by a simple linear insertion of the connector through the slot and which is easily disconnected. Members 24 are confined to their respective sides of the slot, and have sliding clearance therein at their outer ends. Clips 34 have sliding clearance between tabs 13 and 15. Under elevated temperatures the grid members seek to expand, and will buckle unless such expansion can be absorbed by the grid system. In the present invention, any such expansion is accommodated, and buckling worked as follows:

Stops 38, 40 abut stop tabs 13, 15, when the connector is in place. Upon expansion cross T 3 develops sufficient force to drive stops 38 and 10 beyond stop tabs 13 and 15 shearing and/or twisting stop tabs 13, 15 in the process, as depicted in FIG. 8. Cross T 3 can now expand with shoulder 17 camming flange 8 onto flange 7 and connector 18 being carried further through slot 12. Recess 30 in the upper edge of end member neck 28 permits such upward movement of the connector and its cross T.

Thus, cross T members 3 can expand toward main members 1, to prevent buckling of the grid system under abnormally elevated temperatures. Even in an expanded condition, member 24 remains inserted in slot 12 to maintain a strong connection keeping the fire retarding ceiling intact.

Thus, it will be appreciated that the present invention fully accomplishes its intended objects, providing a supporting grid for fire retarding ceilings that is effective and easily fabricated. The connectors of this invention maintain a strong, rigid joint effected merely by inserting the connector into the slot. Operation of the connector at elevated temperatures is not dependent upon fusible materials or the like, and expansion of grid members proceeds without substantially destroying the connector. For this reason, a strong rigid connection is maintained throughout and even after grid member expansion.

It is to be understood that the foregoing detailed description is given by way of illustration only, and that various modifications and variations of the connector described in detail herein can be made without departing from the spirit and scope of the invention as claimed.

We claim:

1. A locking connection for supporting grid systems and the like comprising a first support member having a web with a slot therein, a second support member, and a locking connector extending from said second support member for insertion through said slot, said locking connector including a stop shoulder engaging against one side of said web and a resiliently yieldable locking part yieldably camming against an edge of said slot upon insertion through said slot and snapping back to engage against the opposite side of said web, said second support member being spaced from said first support member web when said locking connector is so engaged therewith for lengthwise expansion of said second support member toward said first support member web, the engagement between said stop shoulder and said first support member web being yieldable to accommodate such expansion.

2. A locking connection for supporting grid systems and the like comprising a first support member having a web with a slot therein, opposed upper and lower stop tabs extending into said slot from said web, a second support member, and a locking connector extending from said second support member for insertion through said slot, said locking connector including stop shoulders for engagement against said tabs on one side of said web and a resiliently yieldable locking part for engagement against said web on the opposite side thereof.

3. A locking connection as set forth in claim 2, wherein said stop tabs divide said slot into a pair of slot portions for receiving, in side by side relation, locking connectors as aforesaid from alined second support members on opposite sides of said first support member.

4. A locking connection for supporting grid systems and the like comprising a first support member having a web, a slot in said web, and upper and lower stop tabs extending into said slot from said web, a second support member having a locking connector extending beyond one end thereof for insertion in said slot, said connector including a rigid end member and a spring clip member in side by side relation, said end member having sliding clearance in said slot while being confined to one side thereof by said stop tabs, said spring clip member having sliding clearance between said tabs and having upper and lower shoulders positioned to abut the same, said end member having an opening therethrough forwardly of said shoulders and said spring clip member having a rearwardly directed finger extending obliquely therefrom through said end member opening for engagement against said web on one side thereof when said shoulders are engaged against said tabs on the opposite side of said web, said connector slip-fitting into said slot with said finger being cammed aside and then snapping into locking engagement behind said web.

5. A locking connection as set forth in claim 4 wherein said stop tabs yield upon expansion of said second support member to permit passage of said shoulders and thereby accommodate such expansion.

6. A locking connection as set forth in claim 4, wherein the forward end of said spring clip member is curved across the forward end of said end member.

7. An expansion joint for supporting grid systems and the like comprising a first support member having a lateral flange and an upstanding web, a slot in said web, upper and lower stop tabs extending into said slot from said web, a second support member having opposed lateral flanges and an upstanding web, and a locking connector carried by said second support member for insertion through said slot, said connector having a rigid end member and a spring clip member secured to said second support member web in side by side relation and projecting beyond one end of said second support member, said end member including a neck portion having sliding clearance in said slot while being confined to one side thereof by said stop tabs, said spring clip member having sliding clearance between said stop tabs and having upper and lower stop shoulders positioned to abut said stop tabs, said end member having an opening therethrough forwardly of said stop shoulders and said spring clip member having a rearwardly directed finger extending obliquely therefrom through said end member opening for engagement against said first support member web, on one side thereof, when said stop shoulders are positioned for engagement against said stop tabs on the other side of said first support member web, said connector being slip-fitted through said slot with said finger being cammed aside by a side wall of said slot and then snapping into locking engagement behind said first support member web, said stop tabs yielding in response to expansion of said second support member to permit passage of said stop shoulders, and thereby accommodate such expansions, said second support member flanges having an upwardly offset lip at said one end of said second support member, said lip overlapping said first support member flange and guiding said second support member flange upwardly onto said first support member flange upon expansion of said second support member, said locking connector end member having a recessed upper edge rearwardly of said upper stop shoulder to accommodate such upward movement of said second support member.

8. An expansion joint as set forth in claim 7, wherein said stop tabs divide said slot into a pair of slot portions for receiving a pair of such locking connectors from second support members on opposite sides of said first support member.

9. A locking connection for supporting grid systems and the like comprising, in combination with a first support member having a web portion and a slot therein, a second support member, and a locking connector carried by said second support member for insertion through said slot, said connector including a resiliently yieldable locking part engaging behind said first support member web portion to lock said first and second support members in connected relation when said connector is inserted through said slot, wherein said connector comprises a rigid end member and a spring clip member projecting beyond said second support member in side by side relation, said rigid end member having an opening therethrough, and said spring clip member having a finger projecting therefrom through said opening to comprise said locking part.

10. A locking connection for supporting grid systems and the like comprising a first support member having a web with a slot therein, a second support member, and a locking connector extending from said second support member for insertion through said slot, said locking connector including a stop shoulder engaging against one side of said web and a yieldable locking part engaging against the opposite side of said web, said second support member stop shoulder engaging against a stop tab extending into said slot from said web, said stop tab yielding to permit passage of said connector stop shoulder through said slot to accommodate lengthwise expansion of said second support member.

11. A locking connection for supporting grid systems and the like comprising, in combination with a first support member having a normally vertical web portion and a slot therein, an elongated second support member extending at generally a right angle to said first support member and having a normally vertical web portion and a laterally projecting tile supporting flange, and a locking connector extending from one end of said second support member in the lengthwise direction thereof for insertion through said slot, said connector including a resiliently yieldable locking part yieldably camming against an edge of said slot upon insertion through said slot and snapping back to engage said first support member web portion on the side thereof opposite said second support member and lock said first and second support members in connected relation, said second support member end being spaced from said first support member web when said locking connector is so engaged therewith for endwise expansion movement of said second support member toward said first support member web.

References Cited by the Examiner
UNITED STATES PATENTS

| | | | |
|---|---|---|---|
| 1,726,500 | 8/1929 | Norris | 52—493 X |
| 2,903,104 | 9/1959 | Brown | 189—36 |
| 3,096,862 | 7/1963 | Purdy | 52—665 |

HARRISON R. MOSELEY, *Primary Examiner.*

P. M. CAUN, *Assistant Examiner.*